(12) United States Patent
Voronov et al.

(10) Patent No.: US 8,021,639 B1
(45) Date of Patent: Sep. 20, 2011

(54) METHOD FOR RAPIDLY SYNTHESIZING MONOLITHIC POLYCRYSTALLINE DIAMOND ARTICLES

(75) Inventors: Oleg A. Voronov, East Stroudsburg, PA (US); Bernard H. Kear, Whitehouse Station, NJ (US)

(73) Assignee: Diamond Materials Inc., Piscataway, NJ (US)

( * ) Notice: Subject to any disclaimer, the term of this patent is extended or adjusted under 35 U.S.C. 154(b) by 0 days.

(21) Appl. No.: 12/807,932

(22) Filed: Sep. 17, 2010

(51) Int. Cl.
*B01J 3/06* (2006.01)
*C30B 19/00* (2006.01)
*B24D 3/02* (2006.01)
*C09C 1/68* (2006.01)
*C09K 3/14* (2006.01)

(52) U.S. Cl. ............... 423/446; 117/64; 51/309; 51/307; 51/308

(58) Field of Classification Search .................. None
See application file for complete search history.

(56) References Cited

U.S. PATENT DOCUMENTS

| | | | |
|---|---|---|---|
| 4,104,441 A * | 8/1978 | Fedoseev et al. | 428/408 |
| 5,273,730 A * | 12/1993 | Yoshida et al. | 423/446 |
| 5,404,835 A | 4/1995 | Yoder | 117/79 |
| 5,874,134 A | 2/1999 | Rao et al. | 427/446 |
| 5,889,219 A | 3/1999 | Moriguchi et al. | 75/236 |
| 6,090,343 A | 7/2000 | Kear et al. | 419/45 |
| 6,214,079 B1 | 4/2001 | Kear et al. | 75/230 |
| 6,783,745 B1 | 8/2004 | Voronov et al. | 423/446 |
| 6,942,729 B2 | 9/2005 | Voronov et al. | 117/68 |
| 7,097,906 B2 | 8/2006 | Gardner | 428/408 |
| 7,101,433 B2 | 9/2006 | D'Evelyn et al. | 117/69 |
| 7,306,441 B2 | 12/2007 | Sung | 425/77 |
| 7,306,828 B2 | 12/2007 | Barrera et al. | 427/427 |
| 7,368,015 B2 | 5/2008 | D'Evelyn et al. | 117/224 |
| 7,371,280 B2 | 5/2008 | Sung | 117/11 |
| 7,377,341 B2 | 5/2008 | Middlemiss et al. | 175/374 |
| 7,377,477 B2 | 5/2008 | Lucek et al. | 249/114.1 |
| 7,384,592 B2 | 6/2008 | Weis et al. | 264/672 |
| 7,462,003 B2 | 12/2008 | Middlemiss | 407/119 |
| 7,473,287 B2 | 1/2009 | Belnap et al. | 51/307 |
| 7,493,973 B2 | 2/2009 | Keshavan et al. | 175/434 |
| 7,510,760 B2 | 3/2009 | Malshe et al. | 428/212 |
| 7,572,718 B2 | 8/2009 | Kanno et al. | 435/585 |
| 7,585,366 B2 | 9/2009 | Sung | 117/79 |
| 7,595,110 B2 | 9/2009 | Frushour | 428/408 |
| 7,608,333 B2 | 10/2009 | Eyre | 428/408 |
| 7,628,234 B2 | 12/2009 | Middlemiss | 175/434 |
| 7,635,035 B1 | 12/2009 | Bertagnolli et al. | 175/434 |
| 7,635,889 B2 | 12/2009 | Isa et al. | 257/309 |

(Continued)

OTHER PUBLICATIONS

Elyutin et al.; Synthesis of Polycrystalline Carbonado Diamonds from Pyrographite; Doklady Chemistry; vol. 378, Nos. 4-6, pp. 160-164; 2001.*

(Continued)

*Primary Examiner* — Melvin C Mayes
*Assistant Examiner* — Guinever S Gregorio
(74) *Attorney, Agent, or Firm* — Watov & Kipnes, P.C.; Kenneth Watov

(57) ABSTRACT

A method for rapidly synthesizing polycrystalline diamond, includes the steps of machining a large monolithic graphite piece, placing the starting graphite piece in direct contact with an activator piece composed of a nickel-base alloy, and subjecting the contacting pieces to high static pressure and high temperature for a time sufficient to cause the starting monolithic graphite piece to undergo complete transformation into diamond to yield monolithic polycrystalline diamond.

12 Claims, 2 Drawing Sheets

U.S. PATENT DOCUMENTS

| | | | | |
|---|---|---|---|---|
| 7,806,206 B1* | 10/2010 | Miess | | 175/434 |
| 2006/0251567 A1* | 11/2006 | Sung | | 423/446 |
| 2007/0295267 A1* | 12/2007 | Sung | | 117/64 |
| 2008/0313968 A1* | 12/2008 | Sung | | 51/307 |
| 2009/0178345 A1 | 7/2009 | Russell et al. | | 51/307 |
| 2009/0218276 A1 | 9/2009 | Linford et al. | | 210/506 |
| 2009/0260895 A1 | 10/2009 | Vail et al. | | 175/434 |
| 2009/0285744 A1 | 11/2009 | Sugihara et al. | | 423/446 |
| 2009/0297429 A1 | 12/2009 | Vohra et al. | | 423/446 |
| 2009/0305039 A1 | 12/2009 | Sumiya | | 428/402 |

OTHER PUBLICATIONS

O. A. Voronov, B.H. Kear; Diamond-Hardfaced TiC/Ti Composite for Submersible Pump Bearings in Geothermal Systems; Clean Technology Conference & Expo 2009, Technical Proceedings, 2009, pp. 9-12.

O. A. Voronov, B.H. Kear; Diamond-Hardfaced Carbide/Metal Composites for Submersible-Pump Bearings in Geothermal Wells; Geothermal Resources Council 2009 Annual Meeting; GRC Transactions, vol. 33; 2009; pp. 653-657.

M. Hart; "Diamond"; Walker Publishing Company, Inc, N.Y., USA; 2001; pp. 1-276.

E. Wilks, J. Wilks; "Properties and Applications of Diamond"; Butterworth-Heinemann Ltd., Oxford, GB, 1994; pp. 1-525.

K.E. Spear, J.P. Dismukes; "Synthetic Diamond: Emerging CVD Science and Technology"; John Wiley & Sons, Inc., New York, USA; 2001; pp. 1-663.

* cited by examiner

METHOD FOR RAPIDLY SYNTHESIZING MONOLITHIC POLYCRYSTALLINE DIAMOND ARTICLES

FIELD OF THE INVENTION

The present invention relates to diamond materials, and more particularly, a method for rapidly synthesizing monolithic polycrystalline diamond by the transformation of monolithic graphite under high static pressure at high temperature.

BACKGROUND OF THE INVENTION

For many structural applications, polycrystalline diamond is preferred over single crystal diamond because of its superior fracture toughness. The fracture toughness is due in part to the presence of (111)-type cleavage planes in the diamond cubic structure. In single crystal diamonds, once a cleavage crack is initiated on a (111) plane, the crack propagates relatively unimpeded through the crystal. In polycrystalline diamonds, the lack of continuity in cleavage planes from one grain to the next greatly impedes crack propagation. Naturally-occurring polycrystalline diamonds clearly demonstrate this effect. Although rare and expensive, such naturally-occurring polycrystalline diamonds are used in particularly demanding applications, such as in rock-drill bits where load factors are high.

High quality diamond powders (grits), films, bulk crystals and diamond-metal composites are widely manufactured for many applications. Diamond grits are produced by hot pressing carbon precursors (e.g., graphite powder) under high pressure and high temperature conditions, within the region of thermodynamic stability of diamond. Thin films of diamond are produced by chemical vapor deposition (CVD) utilizing $CH_4/H_2$ mixtures as precursors and hydrogen plasma. Though the diamond films produced are high quality, the growth rates are low and processing costs are relatively high.

Diamond-metal composites are composed of a high fraction of diamond particles cemented together with a metallic binder, such as cobalt. The ductile metallic binder imparts toughness to the composite, while the diamond component provides superior wear resistance. In practice, a thin layer of the diamond-metal composite is bonded to a supporting substrate, such as cobalt-cemented tungsten carbide (WC/Co). Such diamond-hardfaced WC/Co composites (also known as polycrystalline diamond compacts or PDCs) are widely used in machine tools and rock-drill bits, because of their high cutting rates and long service lives.

Due to the demand for polycrystalline diamonds in various applications, there is a need for a method for rapidly synthesizing polycrystalline diamonds having strong crystallite boundaries, and with nano- or micro-grained structures for enhanced strength and toughness. There is a further need for such a method that is cost effective and simple to implement using existing equipment.

SUMMARY OF THE INVENTION

The present invention relates generally to a method for rapidly synthesizing monolithic polycrystalline diamond by complete transformation of monolithic graphite, assisted by high static pressure. The starting material is in the form of monolithic polycrystalline graphite, preferably synthetic, dense and in cylindrical form. The method of the present invention further involves the use of a small amount of a nickel-base alloy positioned in contact with the starting material to activate the transformation of graphite into diamond. The resulting phase transformation propagates rapidly through the material wherein the $sp^2$ bonds are replaced by $sp^3$ bonds. The present method promotes complete phase transformation and eliminates any residual graphite that may be located, for example, at crystallite boundaries, which can seriously degrade mechanical performance of the resulting product. The processing time for completing the phase transformation is on the scale of seconds. The relatively short processing time desirably reduces the cost of fabrication.

The polycrystalline diamonds produced by the method of the present invention exhibit desirable properties including high hardness, superior wear resistance, good fracture toughness, and excellent polishability, while being relatively simple and cost effective to produce. The method of the present invention has been found to afford considerable flexibility in tailoring the properties of the resulting polycrystalline diamond, suitable to meet a range of performance requirements for different applications. The method of the present invention utilizes existing materials and available equipment, and reduces the time and cost needed for production.

In one aspect of the present invention, there is provided a method for rapidly synthesizing monolithic polycrystalline diamond, which includes the steps of
obtaining a starting material of monolithic polycrystalline graphite;
placing the starting material in direct contact with an activator composed of a nickel-base alloy; and
subjecting the combination of the starting material and activator to high static pressure and temperature for a time sufficient to cause the starting material to undergo complete phase transformation to yield the monolithic polycrystalline diamond.

BRIEF DESCRIPTION OF THE DRAWINGS

The following drawings are illustrative of embodiments of the present invention and are not intended to limit the invention as encompassed by the claims forming part of the application.

DETAILED DESCRIPTION OF THE INVENTION

Figure 1:
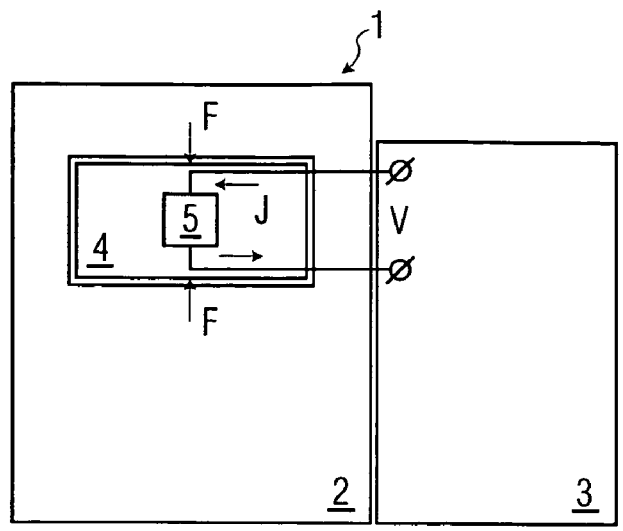
FIG. 1 is a schematic representation of a high pressure-high temperature apparatus for implementing a method for one embodiment of the present invention.

The present invention is directed generally to a method for rapidly synthesizing monolithic polycrystalline diamonds. The method involves rapidly transforming polycrystalline graphite starting material into polycrystalline diamond. The method of the present invention further involves the use of a nickel-base alloy activator positioned in contact with the starting material to activate a transformation process. The resulting phase transformation propagates rapidly through the material wherein the graphite-type $sp^2$ bonds are replaced by diamond-type $sp^3$ bonds. The present method promotes the process that completely transforms all graphitic carbon into diamond phase of carbon. It is an important factor since any residual graphite that may be located, for example, at grain boundaries, can seriously degrade mechanical performance of the resulting monolithic diamond body and cause its disintegration into powder. The processing time for completing the phase transformation is on the scale of seconds. The relatively short processing time desirably reduces the cost of fabrication.

The polycrystalline diamonds produced by the method of the present invention exhibit desirable properties including high hardness, superior wear resistance, good fracture toughness, and excellent polishability, while being relatively simple to produce. The method of the present invention has been found to afford considerable flexibility in tailoring the properties of the resulting polycrystalline diamond, suitable to meet a range of performance requirements for different applications. The method of the present invention utilizes existing materials and equipment, and reduces the time and cost needed for production.

In accordance with one embodiment of the present invention, there is provided a method for rapidly synthesizing polycrystalline diamond, which includes the steps of obtaining a starting material of monolithic polycrystalline graphite, placing the starting material in direct contact with an activator composed of a nickel-base alloy, and subjecting the combination of the starting material and activator to high static pressure and temperature for a time sufficient to cause the starting material to undergo complete phase transformation to yield the monolithic polycrystalline diamond. The starting material is unitary piece machined into a pre-determined shape, such as sheet, disc, rod, tube, sphere or any other shape, and transformed into a monolithic polycrystalline diamond piece of similar shape. An example of a monolithic polycrystalline graphite starting material includes a machined cylinder of synthetic graphite composed of pure polycrystalline graphite.

The term "polycrystalline" is intended to refer to solids that are composed of crystallites varying in size and orientation, and forming boundaries where crystallites meet.

The starting material is placed in contact with the activator and subjected to high pressure and high temperature (HPHT) conditions. The activator is composed of a nickel-base alloy, selected, for example, from Ni72Cr16Fe8 (Inconel), Ni74Cr15Fe7TiAlNb, Ni80Cr20 (Nichrome), Ni80Fe15Mo5, Ni80Fe20, Ni90Cr10 (Chromel), Ni95 (AlMnSi)5 (Alumel), and the like. This process initiates a rapid transformation of graphite into diamond to yield a dense polycrystalline diamond body.

In one embodiment of the present invention, during processing of the starting graphite cylinder, the temperature is at least 1000° C. and preferably from about 1400° C. to 2000° C., and the pressure is at least 7 GPa and preferably from about 8 GPa to 10 GPa. The temperature and pressure is maintained for at least 10 seconds, preferably from about 10 seconds to 100 seconds.

The resulting product consists of a dense polycrystalline diamond cylinder exhibiting desirable properties including high hardness, superior wear resistance, good fracture toughness, and excellent polishability. In one embodiment of the present invention the polycrystalline diamond is composed of a nanocrystalline structure (i.e., crystallite or grain size of less than 100 nm or 0.1 micron). Another embodiment of the present invention is a microcrystalline structure (i.e., crystallite or grain size of at least 0.1 micron, preferably 0.1 micron to 1.0 micron). The crystallite size can be adjusted based on modifications to the HPHT processing parameters used.

FIG. 1 shows a schematic example of a high pressure-high temperature system or apparatus 1 suitable for rapid conversion of a shaped graphite piece into a polycrystalline diamond piece via the method of the present invention. The apparatus 1 includes a loading-force generating unit (FU) 2, an electric-current generating unit (EU) 3, a high pressure unit (HP) 4, and a high temperature unit (HT) 5. The HT unit 5 is inserted into HP unit 4, and HP unit 4 is inserted into FU unit 2. The HP unit 4 is electrically insulated from FU unit 2. The HT unit 5 is electrically connected to HP unit 4 and to EU unit 3. The EU unit 3 includes copper cables connected to HP and HT units 4 and 5, respectively, a shunt, and voltage (V) and current (J) meters. An electrical current is supplied to the heater from a power supply to generate the heat energy needed to raise the temperature of the sample. The electronic control includes a processor, a timer, a pressure gage, and electrical motors for driving the oil pumps. It will be understood that the control devices and electrical components are suitably arranged as known in the art to accurately provide the proper control and programming of the pressure and temperature over time needed to convert graphite into diamond of the present invention.

Figure 2:
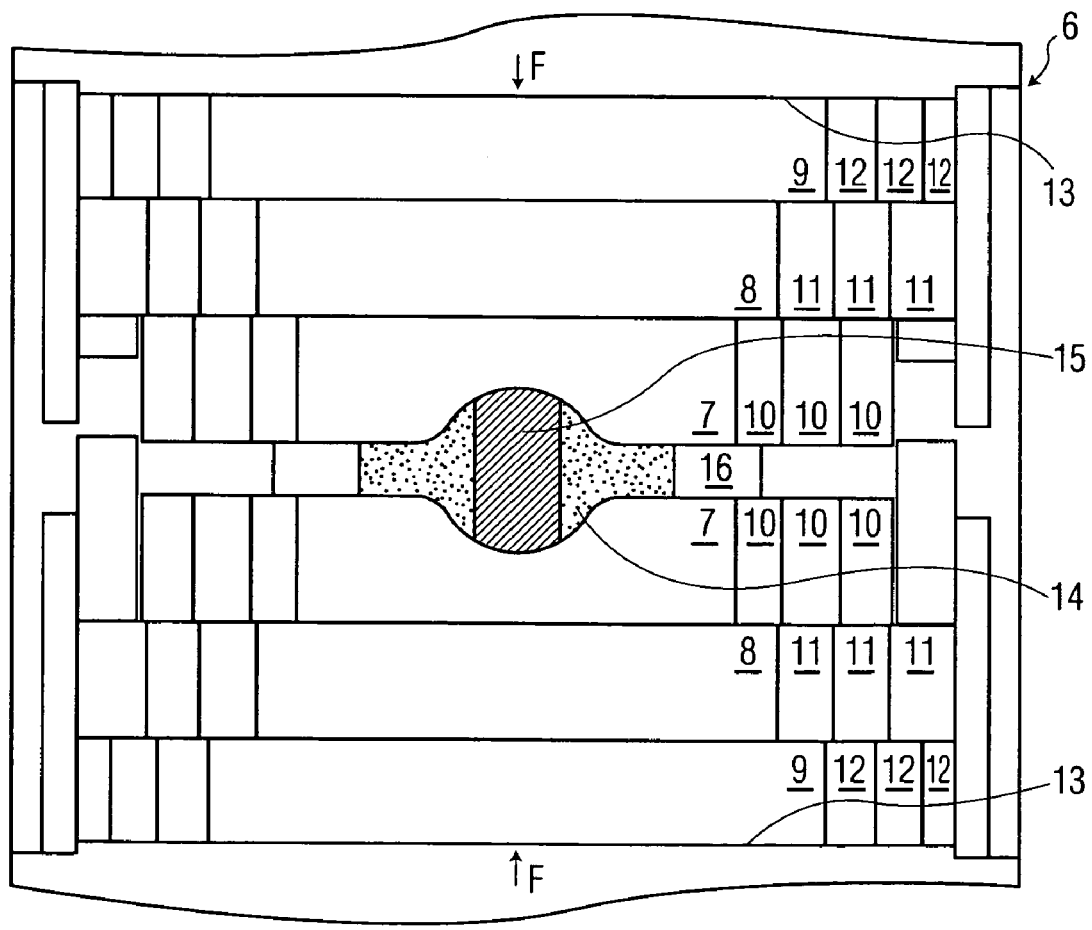
FIG. 2 is a schematic representation of a high pressure unit of the high pressure-high temperature apparatus of FIG. 1 in accordance with the present invention.

FIG. 2 shows a schematic example of the HP unit 4 loaded by a force (F). The force is generated by the FU 2. In this particular example, the FU 2 is a hydraulic press having a frame housing the HP unit 4, and a hydraulically driven working cylinder and ram. The cylinder and ram are driven via pumps in connection with an oil tank and valves. The HP unit 4 includes opposing first and second inner anvils 7, and opposing bearing discs 8 and 9. Anvils and bearing discs are supported by corresponding press-fitted steel rings, or by set of two-four press-fitted steel rings 10, 11 and 12. Preferably each set consists of three rings, as shown in FIG. 2. Insulating layers 13 electrically separate HP unit 4 from FU unit 2.

A container 14 is positioned and compressed by the anvils 7. The container 14 is composed of clay material surrounding the HT unit 5, and further includes a deformable ring 16 extending there around. The container 14, the reaction cell 15 and the deformable ring 16 are each disposed between the anvils 7 and loaded by force F through bearing discs and anvils.

A pair of confronting profiled anvils forms a cavity therebetween. The anvils are constructed of a material (WC/Co) that is harder than first bearing discs 8, and first bearing discs 8 are harder than second bearing discs 9. The first supporting ring of sets 10, 11, 12 is constructed of a material (hardened steel) that is softer and more flexible than that of anvils 7 and bearing discs 8, 9, the second supporting ring of sets is softer and more flexible than the first. The third supporting ring of sets is softer and more flexible than the second supporting ring.

Figure 3:
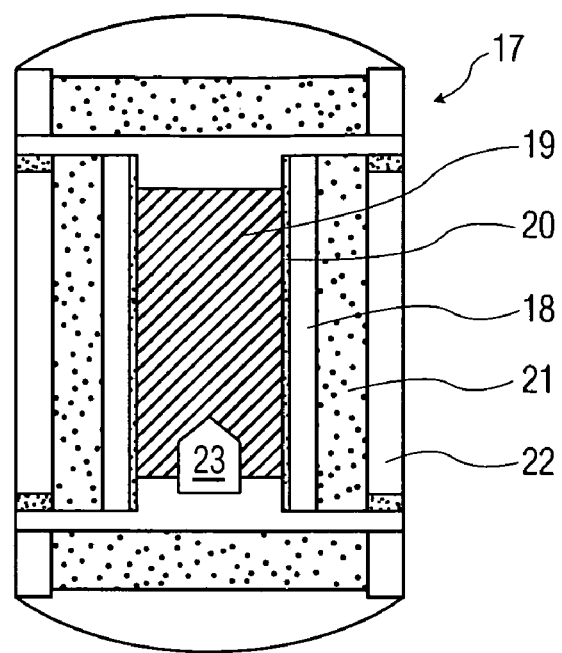
FIG. 3 is a schematic representation of a high temperature unit of the high pressure-high temperature apparatus of FIG. 1 in accordance with the present invention.

FIG. 3 shows a schematic of a reaction cell 15 including the HT unit 5. The reaction cell 15 includes a graphite heater 18 extending around a sample 19 and insulating layer 20 that compose the HT unit 5. The reaction cell 15 further includes the insulating layer 21, the screen 22 and other electrically conducting and insulating components that provide electrical contact of heater to anvils 7 while maintaining thermal separation of HT unit 5 from HP unit 4. The insulating layers 20 and 21 separate (chemically and electrically) sample 19 from heater 18, and heater 18 from screen 22. In this example the layers 20 and 21 are machined from soft ("hexagonal") modification of boron nitride tubes. The heater 18 and the screen 22 are machined from tubes of soft ("graphitic") modification of carbon ceramic, and the sample 19 is machined from high purity graphite rod. The activator 23 is machined from Ni-base alloy rod. Insulation 21 and screen 22 are needed when the temperature is above 1600° C.

The design of the HPHT apparatus 1 is similar to the HPHT apparatus as taught in Voronov (U.S. Pat. No. 6,942,729), the content of which is incorporated herein by reference to the extent it does conflict therewith, but is simplified for pressure and temperature ranges that are used in the present invention. The design of the apparatus described in U.S. Pat. No. 6,942,729 is more complicated, since it was invented to generate very (extremely) high static pressure and temperature in relatively large volume. The present modification is economical and technically viable for industrial applications.

Figure 4:
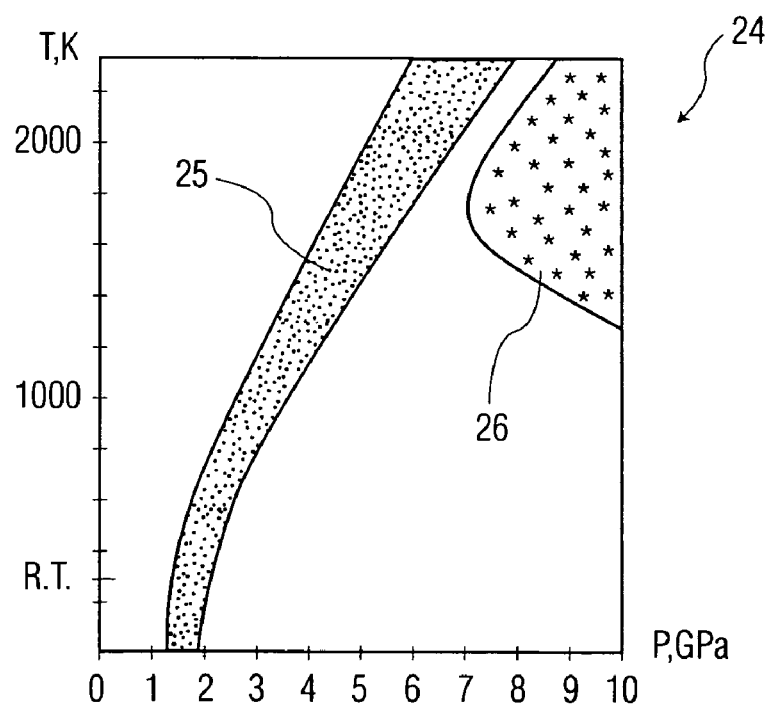
FIG. 4 is a pressure-temperature phase diagram for carbon showing a line and possible error of equal thermodynamic potentials of graphite piece and diamond piece and a second region where complete transformation of graphite piece into polycrystalline diamond piece was observed experimentally, in the presence of a nickel-base activator in accordance with the present invention.

As indicated in FIG. 4, a pressure-temperature phase diagram 24 for carbon is shown. The region of the phase diagram identified by reference numeral 25 represents the line with possible error of theoretical equal thermodynamic potential of large graphite piece and large diamond piece. The region identified by reference numeral 26 represents the HPHT conditions experimentally determined to be suitable for transforming large graphite cylinder into a stable diamond phase (e.g., polycrystalline diamond) through implementation of the present method. The crystallite sizes of the polycrystalline diamond product can be adjusted based on modifications to the HPHT processing parameters as identified within region 26.

EXAMPLES

Example 1

The step-by-step procedure used to make a polycrystalline diamond piece is as follows:
Machine a cylindrical test piece of synthetic graphite, machine a nickel-base alloy activator, and insert them into HT unit 5;
Place HT unit 5 into HPHT apparatus 1;
Subject test piece to a pressure of about 7 GPa, increase temperature up to 1300° C., and hold for 30 seconds;
Reduce temperature to ambient temperature, reduce pressure to ambient pressure, and extract container with test piece from reaction cell of HPHT apparatus 1.

Example 2

The step-by-step procedure used to make a polycrystalline diamond piece is as follows:
Machine a cylindrical test piece of synthetic graphite, machine a nickel-base alloy activator, and insert them into HT unit 5;
Place HT unit 5 into HPHT apparatus 1;
Subject test piece to a pressure of about 10 GPa, increase temperature up to 1000° C., and hold for 60 seconds;
Reduce temperature to ambient temperature, reduce pressure to ambient pressure, and extract container with test piece from reaction cell of HPHT apparatus 1.

Example 3

The step-by-step procedure used to make a polycrystalline diamond piece is as follows:
Machine a cylindrical test piece of synthetic graphite, machine a nickel-base alloy activator, and insert them into HT unit 5;
Place HT unit 5 into HPHT apparatus 1;
Subject test piece to a pressure of about 8 GPa, increase temperature up to 1200° C., and hold for 50 seconds;
Reduce temperature to ambient temperature, reduce pressure to ambient pressure, and extract container with test piece from reaction cell of HPHT apparatus 1.

Example 4

The step-by-step procedure used to make a polycrystalline diamond piece is as follows:
Machine a cylindrical test piece of synthetic graphite, machine a nickel-base alloy activator, and insert them into HT unit;
Place HT unit 5 into HPHT apparatus 1;
Subject test piece to a pressure of about 8 GPa, increase temperature up to 2000° C., and hold for 10 seconds;
Reduce temperature to ambient temperature, reduce pressure to ambient pressure, and extract container with test piece from reaction cell of HPHT apparatus 1.

Example 5

Polycrystalline diamond test pieces were characterized to prove that phase transformation of graphite into diamond did occur.

Scratch tests were performed on plates of silicon carbide (SiC), tungsten carbide-cobalt (WC-Co), and diamond. Test pieces of polycrystalline diamond readily scratched plates of SiC and WC—Co, and to a lesser extent also scratched diamond.

When tested using a conventional Vickers hardness measuring device, the diamond Vickers and Knoop indenters became blunted.

Test pieces of polycrystalline diamond enabled machining of SiC and other ceramics, machining of WC—Co composites, all with no detectable wear, and machining of diamond with detectable wear. After removing the activator from a test piece, the measured density corresponded to that of diamond (3.5 g/cm$^3$). In addition, X-ray diffraction analysis showed all diamond peaks.

The conversion of graphite into diamond was also observed by monitoring changes in resistivity in the HT unit 5. A marked change in resistivity occurs when a test piece transforms from conducting graphite into insulating diamond.

Several Ni-base alloys, such as Ni72Cr16Fe8 (Inconel), Ni80Cr20 (Nichrome), and Ni95(AlMnSi)5 (Alumel) activated the phase transformation in a similar but not identical manner—the higher the concentration of Ni in the alloy, the faster the reaction rate.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for rapidly synthesizing a monolithic polycrystalline diamond piece, comprising the steps of:
   forming from a starting material of pure polycrystalline graphite a unitary piece of monolithic polycrystalline graphite having a desired shape;
   placing the unitary piece of monolithic polycrystalline graphite in direct contact with an activator composed of a nickel-base alloy; and
   subjecting the unitary piece of monolithic polycrystalline graphite and activator to high static pressure and temperature for a time sufficient to cause the monolithic polycrystalline graphite to undergo complete phase transformation to yield a monolithic polycrystalline diamond piece having the desired shape of the unitary piece, wherein the forming step comprises machining the unitary piece of monolithic polycrystalline graphite into the desired shape.

2. The method of claim 1, wherein the temperature is at least 1000° C.

3. The method of claim 1, wherein the temperature is from about 1000° C. to 2000° C.

4. The method of claim 1, wherein the pressure is at least 7 GPa.

5. The method of claim 1, wherein the pressure is from about 7 GPa to 10 GPa.

6. The method of claim 1, wherein the time is at least 10 seconds.

7. The method of claim 1, wherein the time is from about 10 seconds to 100 seconds.

8. The method of claim 1, wherein the unitary piece of monolithic polycrystalline graphite has a cylindrical shape.

9. The method of claim 1, wherein the crystallite size of the polycrystalline diamond is from about 10 nm to 100 nm.

10. The method of claim 1, wherein the crystallite size of the polycrystalline diamond is from about 0.1 micron to 1 micron.

11. The method of claim 1, wherein the desired shape is selected from the group consisting of a sheet, disc, rod, tube, and sphere.

12. The method of claim 1, wherein the nickel-base alloy is selected from the group consisting of Ni72Cr16Fe8, Ni74Cr15Fe7TiAlNb, Ni80Cr20, Ni80Fe15Mo5, Ni80Fe20, Ni90Cr10, Ni95(AlMnSi)5, and combinations thereof.

* * * * *